INVENTOR
Henri Chaumont

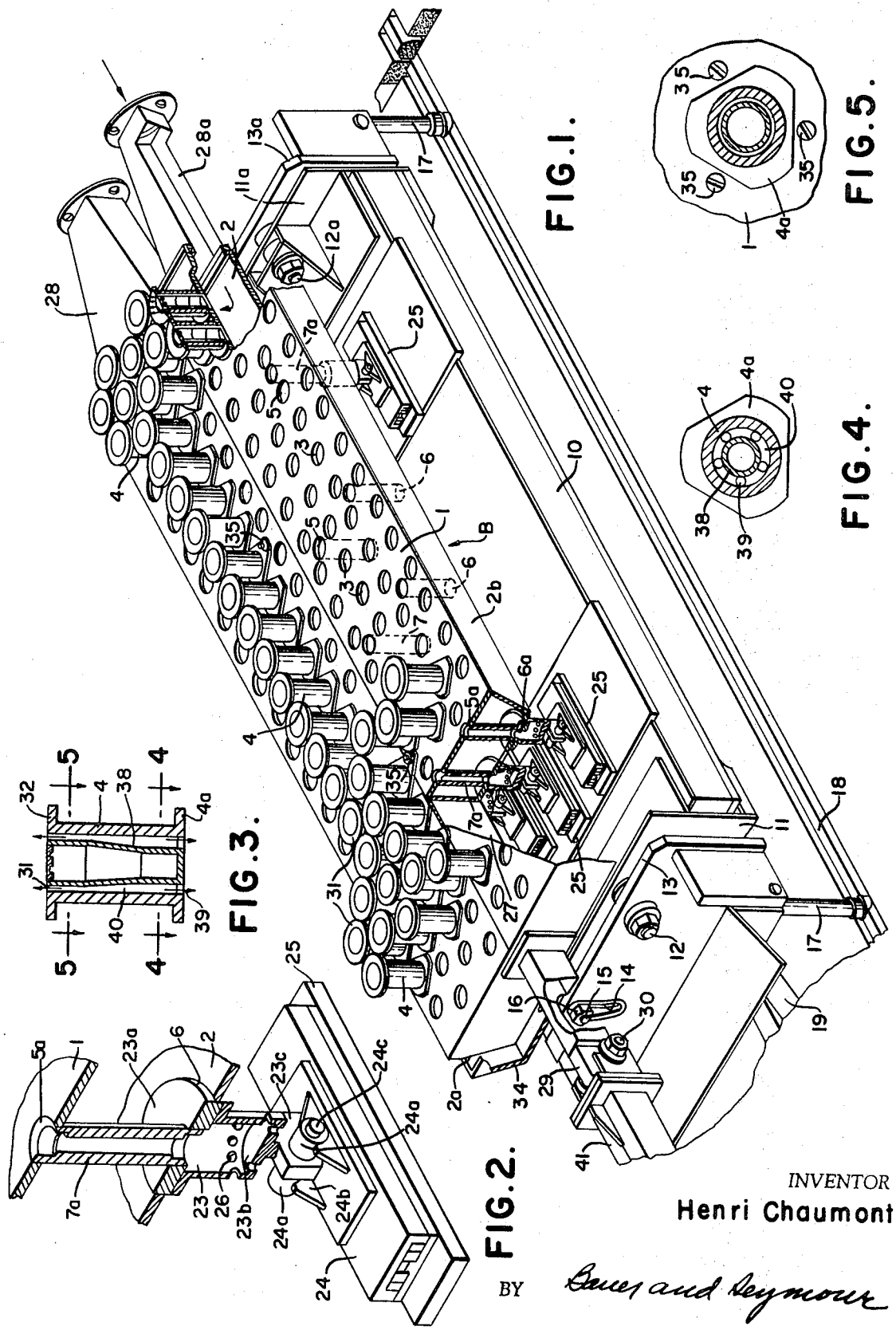

Oct. 6, 1970  H. CHAUMONT  3,532,481
METHOD AND APPARATUS FOR TRANSPORTING AND SMOOTHING SHEET
MATERIALS, ON A GAS SUPPORT BED IN PARTICULAR, SHEET GLASS
Filed Jan. 25, 1967
3 Sheets-Sheet 3

INVENTOR
Henri Chaumont

BY Bauer and Seymour
ATTORNEYS

# United States Patent Office 3,532,481
Patented Oct. 6, 1970

3,532,481
METHOD AND APPARATUS FOR TRANSPORTING AND SMOOTHING SHEET MATERIALS ON A GAS SUPPORT BED, IN PARTICULAR, SHEET GLASS
Henri Chaumont, Brussels, Belgium, assignor to Compagnie de Saint-Gobain, Neuilly-sur-Seine, France
Filed Jan. 25, 1967, Ser. No. 611,631
Claims priority, application France, Jan. 27, 1966, 47,454; Dec. 6, 1966, 86,282
Int. Cl. C03b 29/04
U.S. Cl. 65—25
18 Claims

ABSTRACT OF THE DISCLOSURE

Glass continuously drawn and formed into a ribbon of indeterminant length, is supported on jets of gas distributed over the area of the plastic ribbon. The jets are moved as a unit in a closed path and support the moving ribbon without deformation or defacement thereof and, in fact, improving the planarity of its surfaces.

---

It is known to support a horizontally disposed sheet of material on a cushion of gas provided by a plurality of jets of gas impinging against the under side thereof. Such means avoid contact of the sheet with solid objects and are very useful in preventing marring or defacement of the sheet, particularly if it is in plastic or softened condition. If the sheet such as one of glass, is at a temperature such that it is essentially rigid, a gas-cushion support presents no problems and affords generally satisfactory results.

On the other hand, if the temperature of the sheet is high and the material thereof is therfore plastic, pliable or deformable, the use of gas-cushion supporting means presents serious problems. In such cases the soft or pliable material, such as glass, is sensitive to variations in pressure created by the several jets of gas forming the cushion. At areas of relatively high pressure the sheet tends to elevate relatively to the surrounding areas of the sheet and to form blisters or upheavals, while at areas of relatively lower pressure it sinks and forms depressions. As a result the sheet becomes objectionably wavy and nonplanar and its quality may be affected. If the sheet is stationary or is moving at too slow a speed, the local blisters and depressions are accentuated, due to the fact that the deformations themselves tend, on the one hand, to augment the excess of pressure at certain areas of the sheet, and on the other hand to decrease the already low effective pressure at other areas. At areas of lower pressure the sheet may sag to the extent of coming into contact with solid parts of the equipment; and these contact points result in further and augmented distortion and defacement of the sheet.

The present invention has for its chief object, to provide a method and an apparatus by which the disadvantages and drawbacks set forth in the preceding paragraphs, are avoided and overcome.

More specifically it is an object to provide a method and an apparatus as aforesaid, wherein spaced orifices or tubes forming supporting jets are distributed over the area of support for the sheet and are moved, reciprocated or oscillated as a unit in a closed path, so that areas of relatively high pressure alternate with areas of relatively low pressure and the two effectively cancel out.

A further object is to provide an apparatus as aforesaid, wherein exhaust ducts or tubes are also distributed over the sheet-supporting area and are likewise moved or oscillated in unison with the supporting jets, ducts or nozzles.

Still another object is to provide an improved form of jet-forming tube which is effective and efficient in exerting a supporting force upon the sheet material and which, at the same time, permits the plurality of tubes to be properly relatively positioned and closely and uniformly distributed over the effective sheet-supporting area of the assembly.

Another object is to provide an improved construction by which supporting gas after emerging from the respective jet-forming tubes and exerting a force upon the sheet or ribbon, is efficiently withdrawn by and through a plurality of exhaust tubes regularly distributed among the jet-forming tubes.

Yet another object is to provide an apparatus as aforesaid, wherein the exhaust tubes, in addition to their principal function as in the immediately preceding object, aid and assist in rigidifying the movable gas-cushion assembly and in equalizing the temperature of the walls thereof.

A further object is to provide an apparatus of the type stated, in which all walls and parts connected therewith are automatically maintained at essentially constant or uniform temperature or temperature gradients throughout and, at the same time, effects uniform and even reduction in temperature of the supported sheet.

Ancillary to the immediately foregoing object, it is a further object to provide a method and apparatus wherein the degree or rate of surface cooling of the sheet may be closely regulated and controlled.

A further and important object is to provide a method and apparatus of the type stated, and which in addition to providing the desired gas-cushion support, aids and assists in smoothing the supported sheet by the elimination of irregularities in its surfaces.

Ancillary to the immediately foregoing object, it is a further object to provde a method and apparatus wherein the degree of surface smoothing effected, may be controlled, and wherein, due to such smoothing, the time, materials and costs required for subsequent grinding and polishing are reduced.

Still another object is to provide an apparatus of the type stated wherein a sheet of material is supported over a movable support comprising a plurality of supporting zones alternating with gas-venting zones, each supporting zone comprising a gas-emission slit and a multidirectional gas-flowing area comprised between said slit and the gas-venting zone surrounding said supporting zone.

A further object is to provide an apparatus as immediately aforesaid wherein the supporting zone comprises a central area surrounded by the gas-emission slit.

Other objects and advantages of the invention will become clear to those skilled in the art, after a study of the following detailed description, in connection with the accompanying drawing.

In the drawing:

FIG. 1 is a perspective view, partly in section, of one complete embodiment of the invention, parts being omitted for clarity of illustration of parts otherwise concealed.

FIG. 2 is a perspective view to an enlarged scale, and partly in section, of one of the exhaust ducts or tubes used in the apparatus of FIG. 1;

FIG. 3 is an axial section to an enlarged scale, of one of the plurality of tuyeres used in the apparatus of FIG. 1;

FIG. 4 is a section in a plane identified by line 4—4, FIG. 3, looking in the direction of the arrows;

FIG. 5 is a section taken in a plane identified by line 5—5, FIG. 3, looking down;

Figure 6:
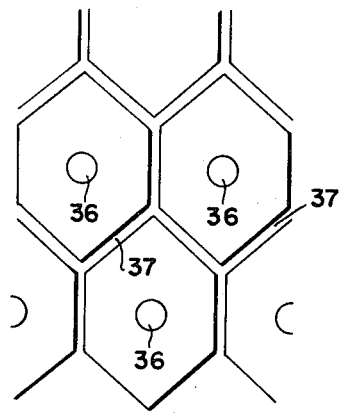
FIG. 6 is a schematic view to an enlarged scale, of a variation in form and arrangement which the gas supply and exhaust ducts may have.

Referring in detail to the drawing, a hollow rectangular box or chest generally identified at B, comprises top and bottom plates 1 and 2, respectively, having edges interconnected and united by end and side walls such as 2a, 2b. Plate 1 is pierced with a large number of regularly geometrically arranged holes 3. A plurality of jet-forming ducts or assemblies as shown in detail upon FIG. 3, are positioned each over a respective one of holes 3. In a manner subsequently described, each of these ducts is secured at its lower end to plate 1, to conduct gas supplied under pressure to the interior of box B, upwardly and to form a supporting jet emerging from its upper end.

Plate 1 is also pierced with a smaller number of holes 5, 5a uniformly disposed over the area of the plate and symmetrically arranged with respect to holes 3. As shown, each of holes 5, 5a is located at the center of a triangular area defined by a related group of three of the holes 3. Bottom plate 2 is also pierced with a number of holes 6, 6a, each disposed directly beneath a respective one of holes 5, 5a in plate 1.

A plurality of hollow pipes, ducts, or reinforcing tubes 7, 7a are provided. As clearly shown upon FIG. 2 for one duct 7a, each has its upper end secured in gas-tight relation in a respective one of exhaust holes 5, 5a in plate 1, extends downwardly through chest or box B, and has its lower end sealed within a corresponding one of the holes 6, 6a in bottom plate 2. In addition to performing their function of conducting exhaust gas from the surface of top plate 1 to the lower exterior of box B, these tubes also act to reinforce the box and to prevent distortion of the upper and lower plates and variations in the spacing between them.

At this time the distinction between tubes 7 and 7a should be noted. Tubes 7a which are arranged in two rows adjacent respective ends of the box, are also connected at their lower ends with means subsequently described in connection with FIG. 2, by which tuyere box B is supported and guided for oscillation or reciprocation in its own plane. Tubes 7 on the other hand, are disposed upon one side or the other of the aforesaid two rows of tubes 7a, and act simply to connect plates 1 and 2 and to conduct exhaust gas downwardly through the box and to discharge it at the lower surface of plate 2. Each tube 7 therefore, merely has its lower end connected to plate 2, about and in gas-tight relation with a respective one of holes 6.

FIG. 3 shows the construction of one of tuyeres 4. Each comprises a hollow cylinder flanged at its ends as indicated at 4a and 32, bottom and top. Reference to FIG. 1 shows that flanges 32 are circular, while from FIGS. 4 and 5 it is noted that flange 4a is in the general form of a triangle with arcuately truncated apices. FIG. 1 shows that the tubes are arranged with flanges 32 coplanar and in near-tangential positions. A second or internal tube 38 has its lower end flanged for a smooth fit within the lower end of tube 4. Regularly spaced holes 39 in the periphery of this flange, pass gas from box B, upwardly in and through the annular space formed between the outer and inner tubes of the tuyere. Tube 38 is closed at both ends, as shown, and its diameter increases from bottom to top so that at its top end, flush or coplanar with flange 32, it is coaxial with but radially spaced from the inner wall of tube 4, to form therewith a circular orifice 31 through which gas issues in the form of an annulus or cylinder.

Each of the tuyeres as just described, is fixed to the top surface of plate 1 of box B, by a number of cap screws 35. Some of these are indicated upon FIG. 1. See also FIG. 5. Each screw is located at the center of the triangle defined by the centers of three triangularly-related holes 3, and its head is of such a size that it may overlap each of three contiguous bottom flanges 4a. Thus each tube assembly 4 is held fixed to plate 1, in gas-tight relation therewith, by three screws 35. Reference to FIG. 5 shows that when flange 4a is in the rotational position shown, with respect to screws 35, the assembly may be simply lifted off plate 1. When it is desired to fix an assembly in place it is merely necessary to position it as shown, to rotate it clockwise for example, until each flange 4a fits beneath the head of a respective one of the screws, and tighten the screws.

It has been previously explained that the exhaust ducts 7a act to support the box or chest B in spaced relation with its base 10. FIG. 2 shows the construction of one of these assemblies. A collar 23a is secured as by threads, to the lower end of each tube 7a at the respective ends of the chest. Each collar fits within a hole in lower plate 2 and is integrally fixed therein. A hollow sleeve 23 is flanged at its upper end. The flange is secured to collar 23a coaxially of the corresponding tube 7a. Sleeve 23 is provided adjacent its lower depending end with a series of uniformly-spaced exhaust holes 26. The lower end of the sleeve is closed by a plug 23b fixed therein. This plug is integral with a depending flange 23c.

The upper face of roller device 24 has aligned bearing hubs 24a fixed to its upper surface by blocks 24b which are spaced to receive flange 23c between them, with a smooth fit. A pivot pin 24c passes through the hubs and is centrally fixed in a hole in the flange, so that each roller device 24 is pivotally connected with its sleeve 23 about an axis which is horizontally transverse of box B. From FIG. 1 it is noted that at the end of the box nearest the viewer, there are a plurality of these constructions just described, one for each tube 7a. The arrangement is preferably such that all pivot pins at this end are in alignment. The construction and arrangement for supporting the box at its other end may duplicate that just described, including a like plurality of the constructions shown at FIG. 2, and similarly transversely aligned.

Each glider or roller device 24 may include rollers, balls or other antifriction means confined by and beneath the device and in contact with a plate 25 bolted or otherwise secured to base 10. Thus, tuyere box B is mounted for free guided motion in its own plane, with respect to base 10, while air or other gas forming the supporting cushion for the glass or like material, is exhausted through tubes 7, 7a, passes downwardly and is discharged at the bottom surface of plate 2. Additional exhaust holes may be provided in plug 23b, as shown upon FIG. 2.

In the model shown, tuyere box B is, for convenience and more uniform distribution of air, formed in two discrete longitudinally extending sections separated by partition walls 27, FIG. 1, and secured together so that top plates 1 are coplanar. Each of these sections is supplied with gas by conduits 28, 28a connected to respective end walls and in communication with the interior of its section. Suitable flexible tube or conduit means, not shown, are connected with the other ends of conduits 28, 28a and permit free movement of the chest or box.

For the purpose previously explained, box B is moved in its predetermined path of oscillation or reciprocation, by an eccentric not shown, operating upon a connecting rod 41 at the end of the chest remote from conduits 28, 28a. This connecting rod is pivotally attached at 30 to bracket 29 fixed to box B. Thus as the eccentric is rotated by power means, chest B is correspondingly oscillated or reciprocated in its own plane over and with respect to base 10 and the sheet or ribbon of glass supported by the cushion of gas produced by jets issuing from tuyeres 4.

Base 10 which has plates 25 fixed to its upper surface, is mounted at its ends by duplicate brackets 11, 11a. Each of these brackets includes vertically-spaced, parallel, generally horizontal flanges. The respective ends of base 10 fit loosely between these flanges and means such as set screws, not shown, are threaded through the flanges and engage the top and bottom faces of the base so that it may be given a precise vertical adjustment by turning of the screws. These also act when locked in position, to hold the base fixed relatively to the brackets.

Referring specifically to the construction supporting bracket 11, FIG. 1, a horizontal pivot bolt 12, fixed to the bracket extends through a bearing in vertical plate 13. This plate has an arcuate slot 14 coaxial of the axis of the bolt. A second bolt 15 secured at one end in plate 13, passes through the slot with a smooth fit and has a lock nut 16 threaded onto its free end. The construction of plate 13a at the other end of box B is a duplicate of the one just described so that it is sufficient to identify pivot bolt 12a and bracket 11a, supported thereby. Bolts 12, 12a are in horizontal alignment transversely of the direction of travel of the ribbon of glass.

Thus, by loosening nut 16 and its counterpart, not shown, at the other end of the box, base 10 and all parts supported thereon may be given a limited adjustment about the axis of bolts 12, 12a. Tightening of the nuts maintains the desired angular adjustment.

Plate 13 is mounted on and supported by a pair of posts one of which is identified at 17, FIG. 1. The other post is obscured by the plate. At their lower ends these posts rest upon and are guided by respective horizontal parallel tracks, one of these being identified at 18. Plate 13a is similarly mounted and supported, so that the entire assembly may be adjusted and guided on and along the tracks.

For this purpose, referring to plate 13, a rod 19 has one end pivotally connected with the plate. The rod is in two aligned sections and is adjustable in effective length by an elongated nut having right- and left-hand threads interconnected these sections. A yoke, not shown, secured to any convenient stationary part of the apparatus, is pivotally connected to one section of the rod 19, etc., just described. This construction is duplicated at the other end of the box, in connection with plate 13a, so that by proper turning of the two nuts, the entire assembly may be precisely moved on and along tracks 18, and fixed in adjusted position transversely of the direction of travel of the ribbon of glass.

In operation, air introduced under pressure at 28, 28a, into box B, passes upwardly through holes 39 in each tuyere assembly 4, FIG. 3, and emerges in annular form from orifices 31, to impinge against the lower surface of the sheet or ribbon of glass extending over all of the orifices. The sheet is thereby supported free and clear of all solid objects. The gas spills radially outwardly in all directions and exhausts through holes 5, 5a, and tubes 7, 7a and holes 26 in sleeves 23 to the exterior of the box and the surrounding atmosphere.

In passing through box B the gas assists in equalizing the temperature thereof, particularly its top and bottom walls 1 and 2. This equalization is promoted by thermal conduction of exhaust tubes 7, 7a. Thus in spite of the fact that the gas becomes considerably elevated in temperature by contact with the glass, deformation of the plates 1 and 2 of the mobile chest is avoided and the plate 1, in particular, remains planar as required for preeminently satisfactory service. If desired, a sheet metal jacket or pan 34, FIG. 1, may be provided in loosely surrounding relation with the bottom and side walls of the chest. In such a construction the gas passing downwardly through exhaust tubes 7, 7a can only escape by passing along the bottom of plate 2, then upwardly between side walls 2a, 2b and the side walls of the pan. This path of the exhausted gas further assists in equalizing the temperature of all portions of the mobile chest.

The invention is not limited to the precise shape of jet-forming means described in connection with FIG. 2, that is, wherein the jet-forming slots are in the form of closed annuli. Slots 31 shown as circular in FIG. 1, may be square, rectangular, or of other polygonal form. In the construction previously described the jet-forming assemblies are closely spaced, leaving sufficient areas in plate 1 for orifices 5, 5a of the exhaust tubes.

FIG. 6 shows a modification wherein jet-forming or gas-emission slots are in the form of closed polygons, while each polygon thus defined has an escape or exhaust orifice 36 in its central area. In this arrangement, gas emerges through slots 37 and is exhausted at locations each centrally of a respective polygon.

Figure 7:
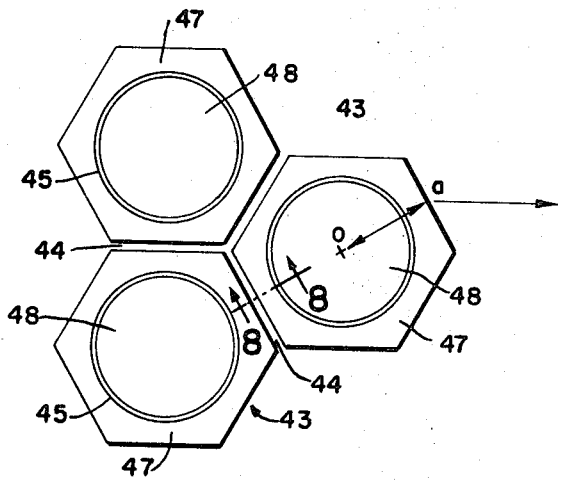
FIG. 7 is a schematic plan view of still another form and arrangement of tuyeres.
Figure 8:
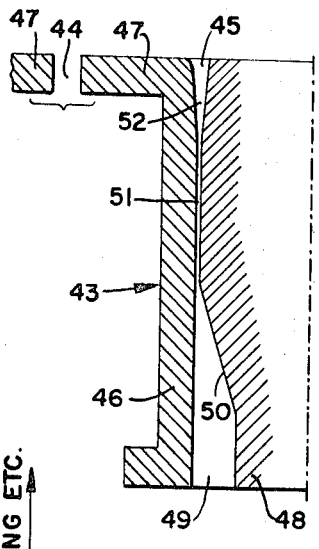
FIG. 8 is an axial sectional detail view to an enlarged scale, taken in a plane about as identified by line 8—8, FIG. 7.

FIGS. 7 and 8 show another construction which the jet-forming and exhaust orifices may have. Each assembly 43 has its upper end in the form of a flat surface of hexagonal shape. These assemblies which, for example, in the apparatus of FIG. 1 would replace tubes 4, item for item, are related in the manner shown for three of them, FIG. 7. The hexagons are thus regularly disposed over the area of the glass to be supported, with their flat surfaces coplanar and separated slightly to form exhaust slots 44. Each hexagonal surface is formed with a circular slot 45 concentric of its center. The actual construction may be essentially like the form shown in detail upon FIG. 3, with flanged lower end secured over a respective one of holes 3 in plate 1, so that gas forced into the box emerges from each assembly in annular form. However, unlike the construction shown at FIG. 3, the spent gas exhausts directly to and through slots 44, by the shortest path. The group of tubes or nozzles are oscillated as a unit with box B, in the directions indicated by the arrow, that is, perpendicular to the direction of movement of the advancing ribbon of glass.

In order that each of the emerging jets of gas may be as laminar as possible, the several jet-forming tubes have a profile as shown upon FIG. 8. Each outer tube 46 is cylindrical and has the aforesaid hexagonal flange integral with its upper end. The inner tube or plug 48 has its vertical axis of symmetry coincident with the corresponding axis of outer tube 46 of assembly 43. Beginning at its lower end this plug has a reduced diameter forming with the outer tube, an entrance for gas at 49, of relatively large radial dimension. A short distance above its lower end the plug has a surface as at 50, of inverted frusto-conical shape so that the radial dimension of the circular slot gradually decreases to form a throat portion at 51. This portion continues upwardly until, near the top, it again widens as indicated at 52, and terminates in the aforesaid circular orifice or slot 45. As shown, the rim of the opening the upper end of tube 46 is rounded off or chamfered. The angle between confronting surfaces at the upper end of the assembly, measured in a radial plane through the axis of symmetry, is about 7°.

Thus, air entering at 49 moves upwardly, progressively increases its kinetic energy as it traverses throat 51 and as it passes along widened portion 52, expands and emerges from slot 45 as a smooth, turbulence-free annulus efficiently applying a lifting force upon the superposed sheet. The rounded edges 52 assist in promoting a smooth non-turbulent flow of gas to the nearest portion of an exhaust slot 44.

Evacuation slots 44 are sufficiently wide to assure proper flow of spent gas to exhaust. This is particularly true because each exhaust slot 44 completely surrounds its corresponding jet-forming slot and therefore has a larger perimeter. The ratio of the length of this perimeter to the circumference of slot 45 is about 3:2 in the form shown upon FIG. 7. Because of the hexagonal form of flange of tubes or tuyeres 46 it is possible to construct an apparatus embodying the invention, with exhaust slots of any desired width required to effect smooth, complete and efficient removal of spent gas.

In the example following, the hexagonal tuyeres are arranged in seventeen rows or tiers each extending transversely to the direction of travel of the ribbon of glass, in a manner similar to that shown upon FIG. 7. The distance between centers of the upper flanges and the axes of symmetry of the tuyeres, is 53 mm. The radial distances Oa may be 25.5 mm. The inner diameter orifices 45 is 38 mm. and the width thereof is 0.5 mm. The width of exhaust slots 44 is 2 mm. The distance through which the box is reciprocated or oscillated is about 80 mm., so that the total travel per stroke, oscillation or reciprocation is 160 mm.

Figure 9:
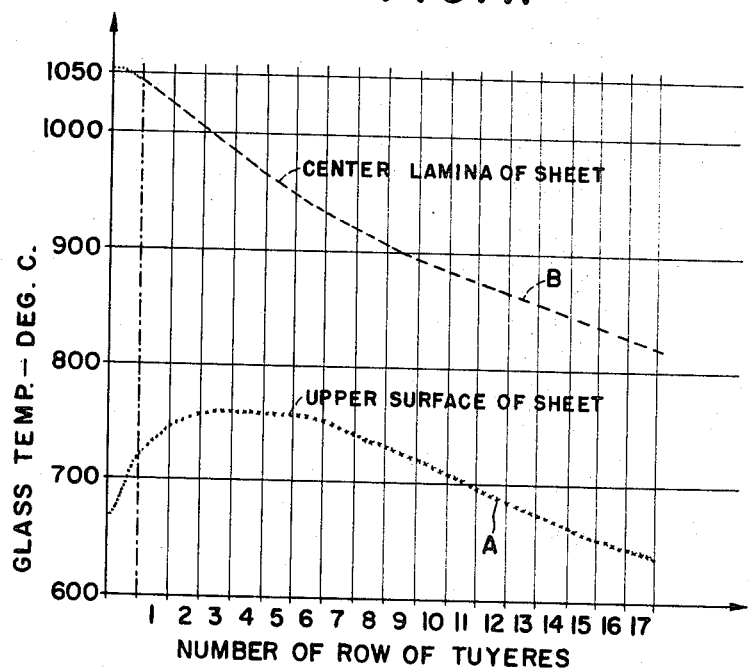
FIG. 9 is a graph showing the changes in temperatures of the glass at various distances in and along its path of travel over and across the supporting gas cushion.

On emergence from the forming rollers the glass has a thickness of about 6.6 mm. The rate of travel of the ribbon, that is, its rate of formation, was about 2.35 m./min. Air forming the gas cushion is introduced at ambient temperature at a pressure of about 120 mm. of water, and a flow rate of 780 m³/hr. By reason of its contact with the hot glass the air at evacuation had a temperature between about 530° and 610° C. Curve "A," FIG. 9, shows the temperature of the upper face of the glass at the respective ones of the seventeen rows or tiers of tuyeres. Curve "B" of the same figure shows the successive temperatures of the center layer of the glass at the corresponding positions. The minimum temperature indicated by the ordinates of the curves is at the tier of tuyeres remote from the laminating rollers.

FIGS. 10 through 17 show sections through the completed sheets of glass in planes normal thereto and extending perpendicular to its direction of travel over the gas cushion. In all of these figures the corresponding scales are the same, but all scales are greatly enlarged from true size and the scale of abscissas is 27.5 mm. per unit of distance, while the scale of ordinates is 0.1 mm. for the same unit. That is, the scale of ordinates is 275 times the scale of abscissas. In each figure, upper and lower profiles show to the scales mentioned, the corresponding surfaces of the completed sheets of glass.

For comparison with FIGS. 11 through 17, FIG. 10 shows the surfaces of a sheet completed without oscillation of the jets or tuyeres. FIGS. 11 through 17 show the profiles of sheets formed when the box and jets connected therewith are reciprocated at increasing rates, as follows:

| FIGURES: | Strokes per minute |
|---|---|
| 11 | 40 |
| 12 | 60 |
| 13 | 80 |
| 14 | 100 |
| 15 | 120 |
| 16 | 140 |
| 17 | 160 |

As previously explained, each stroke is a movement of 80 mm. in one direction and return, for a total movement of 160 mm.

Figure 10:
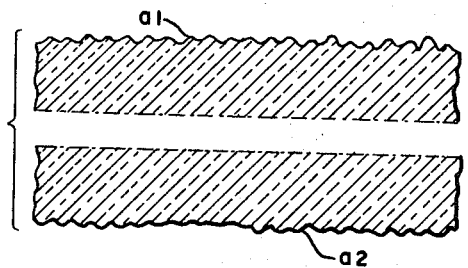
FIG. 10 shows to greatly enlarged scales of ordinates and abscissas, the surface irregularities extant in the completed sheet, when no movement is imparted to the tuyeres.
Figure 11:
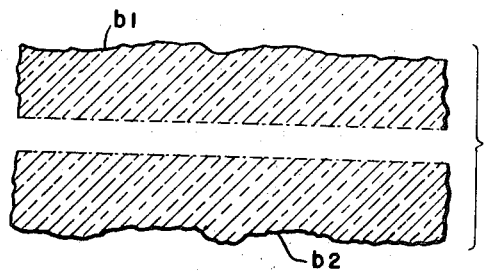
FIGS. 11 through 17 show to scales corresponding to those of FIG. 10, the smoothing effect produced by the supporting gas jets when moved or oscillated at rates of 40, 60, 80, 100, 120, 140 and 160 reciprocations per minute, respectively.
Figure 12:
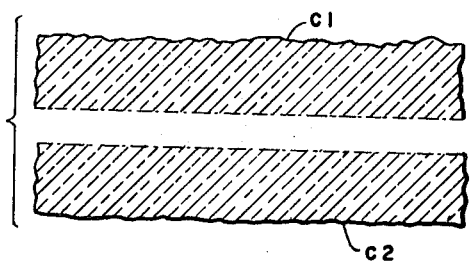
Figure 13:
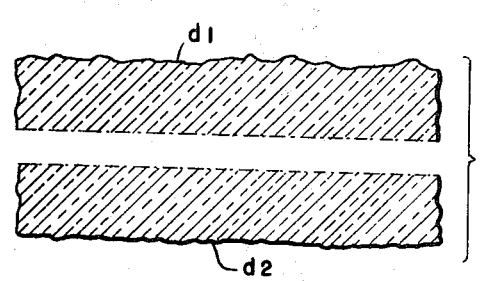
Figure 14:
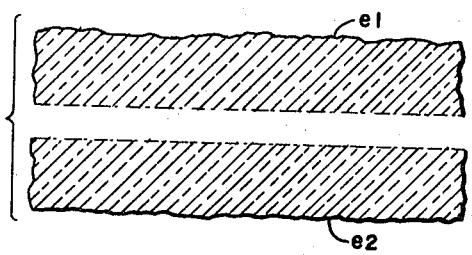
Figure 15:
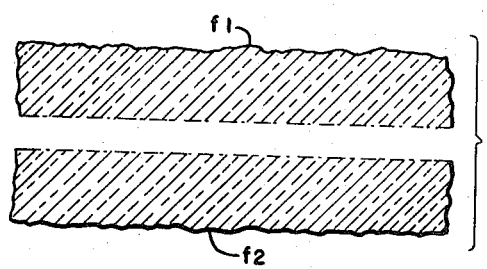
Figure 16:
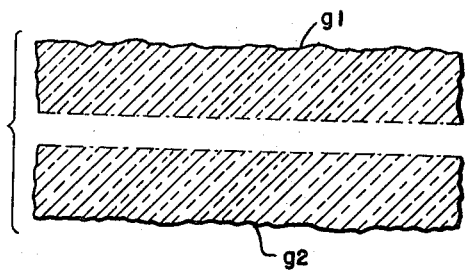
Figure 17:
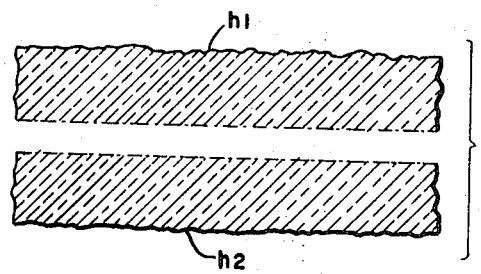

Comparison of FIG. 10 with FIGS. 11 through 17 clearly shows the smoothing effect which reciprocation of the supporting jets has upon the glass. Moreover, it is apparent that the smoothing effect thus produced, increases to a certain extent with the speed or rate of reciprocation, up to about 120 strokes per minute. The conclusion is that the maximum advantages of the invention in this particular installation, are attained at rates of between 120 and 140 strokes per minute.

After the glass has been formed by and between rollers or other known procedure, and has been cooled to rigidity by passing over and across the supporting gas cushion, it is ground and polished to remove surface irregularities and to form an essentially plane polished sheet. Since the invention reduces these irregularities it correspondingly reduces the amount of glass which must be removed per unit area, by grinding and polishing, in order to produce the required final finished surfaces.

Figure 18:
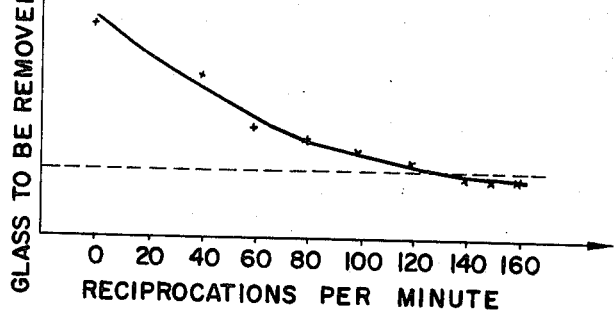
FIG. 18 is a graph showing how the invention reduces the work subsequently required to grind and polish the surfaces of the sheet.

FIG. 18 is a graph with abscissas in strokes per minute, as in the preceding table, and ordinates showing the amount of glass which must be removed per unit of area, to result in a commercially acceptable smooth polished surface for each corresponding rate of reciprocation of the jet assembly. From this graph it is noted that the amount of glass which must be removed by grinding and polishing, decreases rather rapidly with increase in rate of oscillation of the jets, up to about 120, but that there is not much purpose in increasing the rate beyond this value in the apparatus and under the conditions stated. Glass produced at 120 strokes per minute, or 2 strokes per second, has maximum deviation from true planarity which are on the average about 0.02 mm. on the lower surface and 0.05 mm. on the upper surface thereof, so that under conditions stated, little advantage is gained by rates above 120.

On the other hand FIG. 18 clearly shows that oscillating of the jets does in fact, materially flatten out irregularities otherwise remaining in the sheet after it traverses the cushion of gas, and correspondingly reduces the expenditure of work, time and materials required to subsequently grind and polish the sheet to bring its surfaces to commercially acceptable planarity and polish. This is particularly true with respect to the lower surface of the glass, as is strikingly shown by comparison of profile $b2$, FIG. 11, with $c2$ and $d2$, FIGS. 12 and 13, respectively.

Although I have given a specific example of a successful practice of my invention, it will be understood that the rate of oscillation or reciprocation of the supporting tuyeres depends upon a number of factors, in particular upon the viscosity "$\eta$" of the glass, the thickness "$e$" of the sheet, and the distance "$l$" between two consecutive admission orifices or jets. Calculations show that the sag "$f$" of a sheet of glass of thickness "$e$" and viscosity "$\eta$", between two supports separated by a distance "$l$" is approximately $$f = k \frac{l^5}{v\eta e^2}$$

where "$v$" is the speed of the glass with respect to its support, "$k$" is a constant depending upon the units of measurement selected and which takes into account the density of the glass.

As an example, where the distance of separation "$l$" between two adjacent supporting tuyeres is of the order of 40 mm., and the glass is of usual or ordinary composition having a thickness of 5 mm. and a measured temperature of 800° C. ($\eta = 10^{6.3}$ poises), the computed speed of the glass with respect to its support is at least 0.3 m./sec. Such a speed is not possible of attainment with presently known apparatus and procedures of glass production. In fact, speeds of about 0.15 m./sec. are the highest that can be realized with the most modern installations presently avalable.

Furthermore, the speed of 0.30 m./sec. is merely an acceptable minimum which it may be desirable to exceed under certain conditions. Such an increase in speed would be desirable or necessary, for example, in event the temperature of the glass is raised and its viscosity correspondingly decreased, or the thickness of the glass is decreased, or the selected distance between tuyeres is increased. However, inspection of the equation given, shows that "$f$" increases as the fifth power of "$l$" so that the latter value cannot be greatly augmented. In this regard it may be noted, moreover, that for mechanical reasons it is difficult to decrease the distance "$l$" below about 40 mm. In short, the present invention affords means by which relative motion between the glass and its support may, within limits of practicablity, be increased without the requirement for a corresponding increase in the rate of rolling or drawing of the glass itself, and which in a highly practical, satisfactory way, elminates surface irregularities and heterogeneity of the sheet which are otherwise inherent in the alternate disposition of gas-emission and exhaust orifices of prior art devices, as previously explained.

It is of particular advantage to impart to the gas-cushion a movement of such amplitude as will result in the interchange in rhythm, of position with respect to the sheet, between the supporting jet orifices and corresponding exhaust orifices. The actual movement imparted to the assembly in any particular installation, to obtain the desired alternation of positions between he gas-emission and exhaust orifices, is a matter of design or selection. However, in practice, the jets should not be displaced solely in the direction of movement of the sheet. It is advantageous, instead, to select a movement which is a reciprocation or oscillation perpendicular to the direction of movement of the sheet, or a movement which is the resultant of two component movements which may alternate in phase or not. In particular a movement may be selected which is the resultant of two sinusoidal components in phase and of equal amplitude with respect to mutually normal axes, so that each point of the gas cushion traverses a circular path. Whatever the movement effected, it is distinctly advantageous, as previously stated, to give it an amplitude such that there is a continuous and frequent interchange in positions relatively to the sheet between supporting jets and exhaust orifices.

I have found that to realize maximum benefits of which the invention is capable, an arrangement should be selected in which the admission orifices and possibly those of evacuation, are in the form of slots. These may be arranged rectilinearly and parallel, in the form of chevrons, sinusoidal, or other curved form. However, experience has demonstrated that particularly good results are obtained when the jet-forming slots are closed polygons or curves. The actual shape and arrangement of slots for emitting and evacuating the gas which supports the sheet, are subject to variation by those skilled in the art, in accordance with the requirements of each particular installation.

One problem involved in practice of the invention is to provide a construction which is not deformed by the intense heat and the unavoidable temperature gradients encountered. As will be noted, the present invention effectively solves this problem by reducing temperature gradients to a minimum. This result is due in part to the fact that the gas-cushion forming means is essentially a hollow parallelepipedal box of large capacity. The tuyeres are fixed to the top surface of the box in orderly geometrical arrangement thereover, and at their lower ends are in gas-tight communication with its interior. The top ends of the tuyeres are constructed to form jets of circular or other regular geometrical form. Thus the hot glass is supported out of contact with the tuyeres and in widely spaced relation with the top wall of the box, so that the latter is effectively heat-insulated by the cushion or blanket of air as it emerges, expends its kinetic energy in support of the sheet and returns to exhaust. Tubes such as 7, 7a serve the triple purpose of rigidly interconnecting and rigidifying the upper and lower walls of the box and thus preventing their distortion, of equalizing by conduction temperature differences between these walls, and of imparting by conduction and radiation a certain temperature rise to the entering air as it passes about them within the box.

It is contemplated that the geometrical form of the gas-emission slots may be varied in accordance with their positions with respect to the borders of the cushion. In particular it may be advantageous that the jet-forming tuyeres be so constructed and arranged as to limit the cushion at the border thereof where the sheet first enters it. This may be accomplished by a rectilinear slot or slots in rectilinear, half-moon or like form and shape. Such an arrangement conserves to the maximum the supporting effect of the annular laminae of gas emerging from the tuyeres such as the one shown at FIG. 3. However, the slots are not necessarily required to be in the form of closed lines or curves. In a more general way, the moving jets may be formed by slots which are not closed lines, or by orifices in form other than slots. This is equally true for the exhaust orifices.

However, the form of slots shown is advantageous from a technical point of view because it enables location of the tuyeres at minimum distance apart. This is of great importance as will be noted from the equation given, wherein the distance "$l$" is effective in accordance with its fifth power. The invention is of equal utility no matter whether the glass is formed by rolling, drawing, casting, or other mode of production.

It is further contemplated that two gas cushions may be employed, one below the sheet, as previously disclosed, and the other above the sheet. In such an arrangement the pressure exerted upwardly by the lower cushion will equal the pressure exerted downwardly by the upper cushion plus the weight per unit area of the glass supported, so that equilibrium conditions exist and the glass in effect floats between the two cushions. In such construction, two identical blowing devices and two identical exhaust devices will be used, in which the emission and evacuation zones are respectively directly opposite and are moved synchronously to maintain the directly-opposed relation. Such an apparatus would be particularly useful in the production of relatively thin sheet glass of, say, 3 to 4 mm. in thickness, obtained by rolling the hot glass between rollers of graphite, or metal coated graphite, at temperatures around 1000° C.

The arrangement of two cushions of gas, upper and lower, as just described has the effect of gradually and uniformly reducing the temperature of the glass to solidification and especially in cases where the glass is very hot or very thin, leaves the quality of its surface and its planarity unaffected. The arrangement also prevents spontaneous thickening of the glass which would otherwise result from superficial surface tension. Such beneficial results are not possible with presently known apparatus.

Following is an example of sheet glass produced in accordance with the invention, using an apparatus as depicted upon FIG. 1:

A glass-rolling machine having smoothing rollers of 185 mm., produced a ribbon of glass having a thickness of 6.5 mm. and a width of 1400 mm. The temperature of the glass at its point of emergence from the rollers was about 850° C., corresponding to a viscosity of about $10^{5.6}$ poises.

On emergence from the rollers the ribbon was engaged and supported by a cushion of air supplied by an apparatus as in FIG. 1, and having the principal characteristics as follows:

Blowing box:
    Length in direction of travel of the glass—456 mm.
    Width transversely of ribbon—1625 mm.
    Height—127 mm.
    Inclination to horizontal—10°
Tuyeres:
    Height—102 mm.
    Annular orifice:
        Exterior diameter—44.2 mm.
        Interior diameter—43.6 mm.
    Number of tubes—152
Displacement of box:
    Maximum movement—160 mm.
    Rate of reciprocation (3 runs)—0, 1, 2 strokes/second The resulting glass was evaluated for planarity in two different respects, namely:

(1) Maximum observed deviation ($\Delta e$) in thickness;
(2) Undulation of the sheet, that is, departure thereof from true planarity.

The results were as follows:

Run No. 1—gas cushion at rest
  $\Delta e$—0.12 mm.
  Undulation of sheet—0.21 mm.
Run No. 2—gas cushion reciprocated at rate of 1 stroke/sec.
  $\Delta e$—0.05 mm.
  Undulation of sheet—0.13 mm.
Run No. 3—gas cushion reciprocated at rate of 2 strokes/sec.
  $\Delta e$—0.04 mm.
  Undulation of sheet—0.10 mm.

Thus not only was there a distinct improvement in planarity of the sheet when the gas cushion was oscillated or reciprocated, over that produced when the cushion was at rest, but also the planarity improved in proportion to the rate of reciprocation, thus confirming the results of FIGS. 11 through 17.

By prolongation of the time during which the glass is supported on a cushion of gas which is sufficiently hot, and/or in augmenting the temperature of the glass as it passes over the cushion, it is possible to obtain a smoothness and planarity of the sheet that is equal to or better than a so-called "fire polish."

Heating of the upper as well as the lower surface of the sheet while supported on the mobile gas cushion, as in the preceding paragraph, as, for example, by hot air blown onto the upper surface or by induction heating, may be advantageously used, not only to promote surface smoothing but also for other purposes. As examples there are mentioned surface treatment of the sheet with enamels, frits, and other materials applied thereto as coatings or facings, particularly in thin layers. The elevated temperature of the glass promotes reaction of the covering material or layer, as well as its firm fixation to the underlying surface of the glass. It is therefore within the purview of the invention to use air for the cushion which has been pre-heated either within or before introduction into tuyere box B.

The invention is susceptible of numerous changes in size, shape, relative dispositions of jet and exhaust orifices, construction and interconnections of and between parts, as well as mechanical rates and physical conditions of use and operation. Hence the foregoing disclosure is to be taken in an illustrated rather than a limiting sense.

Having fully disclosed the invention, what I claim and desire to secure by Letters Patent is:

1. Apparatus for pneumatically supporting a sheet of material, comprising, a pressure chest, jet means comprising a plurality of annular gas discharge orifices having substantially aligned upper plane surfaces pneumatically connected to the interior of said chest, means operable to move the sheet in a first direction over and across said jet means for pneumatic support thereby, means to continuously supply gas under pressure to the interior of said chest, and means to move said jet means relatively to and essentially parallel to the sheet, in a closed path having at least a component of motion normal to said first direction.

2. The apparatus of claim 1, each said discharge orifice comprising inner and outer coaxial radially-spaced cylinders forming a cylindrical passageway between them, said passageway being pneumatically connected to the interior of said chest.

3. The apparatus of claim 2, said chest including vertically-spaced upper and lower walls, each said discharge orifice being mounted on said upper wall, the upper termini of all said cylindrical passageways being coplanar, and a plurality of exhaust ducts each including a tube having its upper and lower ends sealed in an opening in said upper and lower walls, respectively, said openings in said upper wall being interspersed among said discharge orifices and exhausting gas discharged therefrom to the side of said chest opposite to said jet means.

4. The apparatus of claim 1, a base, and slide means mounting said chest upon said base for guided translation relatively thereto in a direction parallel with the sheet and normal to said first direction.

5. The apparatus of claim 4, said slide means including a plurality of cylinders each pneumatically connected to a respective predetermined one of a number of said discharge tubes, and provided with apertures outside the chest.

6. Apparatus for supporting glass sheet which comprises surface means and means to flow multiple jets of gas from the surface means throughout a predetermined area, means operable to continuously move a sheet of glass in a first direction in its plane over and across said surface means and said jets of gas, means to oscillate said surface means and jets parallel with the plane of the moving sheet, and means to supply the multiple jets with gas at a sufficient pressure and velocity to support the glass over said area free of solid objects.

7. The apparatus of claim 6, said jet forming means including a pressure chest, having an upper wall, a multiplicity of nozzles mounted on and distributed over said wall, each said nozzle having an annular jet orifice.

8. Apparatus according to claim 7 in which the jet orifices are circumscribed by annular orifices of discharge.

9. The method of pneumatically supporting a sheet of material, comprising, directing a multiplicity of upwardly-directed jets of gas in cooperative arrangement into contact with a predetermined area of the sheet, each jet supplying an annular, horizontal supporting zone including a multidirectional gas pressure area between the jet and a venting area, to support said area of the sheet out of contact with solid objects, continuously advancing the sheet in one direction, substantially in its plane, and simultaneously oscillating the jets of gas relatively to the sheet in a path substantially parallel with the sheet and having at least a component of motion normal to said one direction.

10. The method of claim 9, each said jet being in arcuate laminar form.

11. The method of claim 9, in which the sheet is thermoplastic and in a plastic state.

12. The method of claim 9 and simultaneously directing a multiplicity of downwardly-directed jets of gas distributed over and into contact with the upper surface of the sheet, over said area, the force exerted on the sheet by the lower gas jets counter-balancing the weight of the sheet plus the force exerted by the downwardly-directed upper gas jets.

13. The method of claim 9, oscillation of the jets being in synchronism with time rate of movement of the advancing sheet.

14. The method of claim 9, said path being of closed curvilinear form.

15. The method of claim 9, said path being a straight line.

16. Apparatus for supporting upon a cushion of gas, a ribbon of glass moving continuously in the direction of its length and at deformation temperature, a chest having a generally horizontal, extensive surface penetrated with a first multiplicity of orifices for the emission of gas, and a second multiplicity of orifices for the exhaustion of gas interspersed with the orifices of said first multiplicity, means for supplying gas under pressure to said first multiplicity of orifices, and means connected with said chest for imparting thereto and to said orifices, a rapid reciprocating movement transversely of said direction and parallel with the plane of the glass.

17. The method of smoothing glass at softening temperature comprising, supporting the sheet by and on a multiplicity of annular gas pressure zones of glass leveling temperature distributed over the area of and engaging the sheet, and oscillating the said zones as a unit relatively to the sheet, parallel with the sheet, to periodically direct each said zone in contact, in succession, with each small surface area of the sheet adjacent thereto, the rate of oscillation being selected in accordance with the desired degree of smoothing of the sheet.

18. In apparatus for the pneumatic support of sheet material comprising gas pressure equalizing means, nozzle means of annular orifice and venturi throat connected thereto and supplied thereby.

References Cited

UNITED STATES PATENTS

| | | | |
|---|---|---|---|
| 2,213,405 | 9/1940 | Paddock | 65—349 |
| 3,223,501 | 12/1965 | Fredley et al. | 65—114 X |
| 3,393,062 | 7/1968 | Hesten et al. | 65—348 X |
| 2,724,215 | 11/1955 | Gilstrap | 65—348 |

ARTHUR D. KELLOGG, Primary Examiner

U.S. Cl. X.R.

65—114, 182, 350, 351; 214—1; 302—29